United States Patent [19]
Fry

[11] 3,790,812
[45] Feb. 5, 1974

[54] DEVICE FOR GENERATING A HIGH VOLTAGE SUPPLY

[75] Inventor: Peter William Fry, Dorchester, England

[73] Assignee: Integrated Photomatrix Limited

[22] Filed: July 13, 1972

[21] Appl. No.: 271,239

[30] Foreign Application Priority Data
July 26, 1971  Great Britain.................. 34,982/71

[52] U.S. Cl..................... 307/110, 307/246, 321/15
[51] Int. Cl. ....................... H02m 3/18, H03k 17/66
[58] Field of Search ........ 307/109, 110, 246; 320/1; 323/93; 321/15

[56] References Cited
UNITED STATES PATENTS
3,553,479  1/1971  Nelson............................... 307/110
2,956,183  10/1960  Culbertson......................... 307/109

Primary Examiner—Bernard Konick
Assistant Examiner—Stuart Hecker

[57] ABSTRACT

A voltage generator comprises a capacitor and positive and negative power supply rails. Normally non-conducting first and second field-effect transistors are arranged to isolate the capacitor from the power supply rails in the non-conducting state thereof and to connect the power supply rails to respective plates of the capacitor in a conducting state thereof. Means are provided to trigger the first and second transistors into the conducting state for a limited period to charge the capacitor and then isolate the capacitor when the transistors revert to their normal state. A normally non-conducting field-effect transistor is operative, on isolation of the capacitor subsequent to charging thereof, to adopt a conducting state in which such third transistor connects one of the plates of the capacitor to the opposite supply rail to that to which it can be connected by the respective first or second transistor, whereby to produce an enhanced voltage on the other capacitor plate. The enhanced output is delivered across an output capacitor connected via a fourth field-effect transistor to the said other plate of the first mentioned capacitor.

7 Claims, 1 Drawing Figure

DEVICE FOR GENERATING A HIGH VOLTAGE SUPPLY

BACKGROUND OF THE INVENTION

This invention relates to voltage generators.

A subsidiary supply voltage is often required for an M.I.S. (Metal-insulator-semiconductor) integrated circuit, which voltage is of greater magnitude than that produced by the main power supply but need only supply a very low or negligible current. Such voltage, may, for example, be for connection to the gates of M.I.S. transistors used as loads in the circuit. It is, therefore, common practice to supply two differing voltages to the circuit from two external power supplies. A disadvantage of this arrangement is that it can result in an increased cost and/or complexity of the external circuitry. Furthermore, in some cases it is not possible since the available supplies are limited by other considerations such as battery weight.

OBJECTS AND SUMMARY OF THE INVENTION

An object of the present invention is to provide a voltage generator which may, in practice, be designed as a part of the associated integrated circuit which it is to supply with voltage and which may avoid some or all of the above mentioned disadvantages.

Broadly, the invention provides a voltage generator including a capacitor and associated switching circuitry which is operable initially to charge the capacitor to a first potential and then effectively to isolate the capacitor and apply a reverse potential to one of the plates thereof, thereby to produce an enhanced potential on the other plate.

More specifically, the invention provides a voltage generator including first and second electrically controllable switching devices arranged to be operable to connect opposite plates of a capacitor to the positive and negative rails of a power supply respectively, and a third electrically controllable switching device arranged to be operable to connect one capacitor plate to the opposite rail to that to which it can be connected by the respective one of the first or second switching devices, the arrangement being such that, in operation of the generator, initially the third switching device is open and the first and second switching devices close to charge the capacitor from the power supply, then the first and second switching devices open to isolate the capacitor from the power supply rails and the third switching device closes to apply a reverse potential to the one capacitor plate thereby to produce on the other capacitor plate an enhanced voltage which is fed to an output.

In an embodiment of the invention, closing of the first and second switching devices to charge the capacitor is controlled by application of a pulse to a control electrode of one of the said first and second switching devices.

Suitably, the one of said first and second switching devices connected to the said other capacitor plate is arranged to open in response to said other capacitor plate attaining a predetermined potential.

Advantageously, the said other capacitor plate may be connected to output capacitor via fourth electrically controllable switching device arranged to feed the enhanced voltage to the output capacitor across which the enhanced voltage output may be taken.

Preferably, the arrangement is such that the third switching device closes in response to said other capacitor plate attaining a predetermined potential.

In practice, each of the switches may be constituted by an M.I.S.T.

In one form of generator embodying the invention, the third switching device comprises an M.I.S. transistor having its gate electrode connected to said other capacitor plate.

Preferably, the gate electrode of the third switching device is also connected to one plate of a protective capacitor having its other plate earthed.

Desirably, the first and second switching devices are operated to connect the first mentioned capacitor to the positive and negative rails repeatedly, thereby to enhance further the voltage attained by the said other capacitor plate.

In order that the invention may be readily understood, an embodiment thereof will now be described in more detail, by way of example, with reference to the accompanying drawing which is a circuit diagram of one embodiment of voltage generator according to the invention.

DETAILED DESCRIPTION

Figure 1:
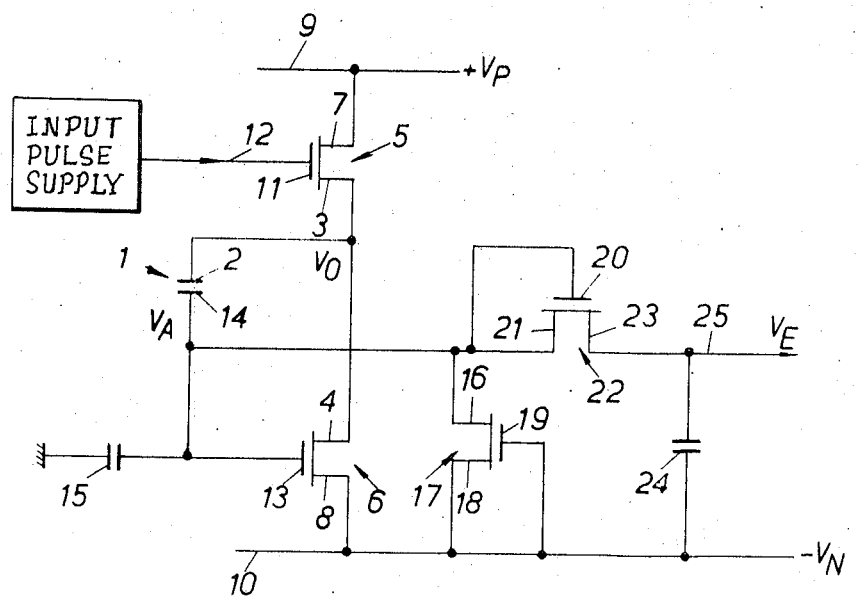

In the embodiment shown in the drawing, a voltage generator is formed as part of an M.I.S. integrated circuit. A capacitor 1 of the generator has one plate 2 connected to respective current carrying electrodes 3 and 4 of two serially connected normally non-conducting M.I.S. transistors 5 and 6. The transistors 5 and 6 have their respective other current carrying electrodes 7 and 8 connected to positive and negative supply rails 9 and 10 to each of which the respective transistor connects the plate 2 when biased into a conductive state.

The gate electrode 11 of transistor 5 is connected to an input line 12, to which input pulses are supplied to bias transistor 5 into its conductive state in which it connects capacitor plate 2 to the positive supply rail 9. The gate electrode 13 of transistor 6 is connected to the other plate 14 of the capacitor 1, so that such transistor is biased into its conductive state, in which it connects capacitor plate 2 to the negative supply rail 10, when the voltage on gate electrode 13 reaches a predetermined value. A protective capacitor 15 of small capacitance is connected between the gate electrode 13 of transistor 6 and earth.

The capacitor plate 14 of capacitor 1 is also connected to current carrying electrode 16 of a normally non-conducting M.I.S. transistor 17 having its other current carrying electrode 18 and its gate electrode 19 connected to negative supply rail 10. The transistor 17 becomes biased into a conductive state, in which it connects capacitor plate 14 to the negative supply rail 10 when the voltage on such capacitor plate attains a predetermined value.

The gate electrode 20 and one current carrying terminal 21 of a further M.I.S. transistor 22 is also connected to the capacitor plate 14 to feed an enhanced voltage produced on such plate during operation of the generator via current carrying terminal 23 to one plate of a capacitor 24 having its other plate connected to the negative supply rail 10. An output voltage $V_E$ is taken across the capacitor 24 on output rail 25.

In operation of the generator, an input pulse on line 12 is fed to the gate electrode 11 and biases transistor 5 into its conductive state. This causes the potential $V_O$ of the plate 2 of capacitor 1 to rise to within about 1 volt of the voltage $V_P$ of positive rail 9. The potential $V_A$ of the other plate 14 of capacitor 1 is pulled up with potential $V_O$ by the action of the capacitor until the threshold voltage $V_T$ of the transistor 17 is reached, when transistor 17 conducts and charges the capacitor 1 to the negative rail voltage $V_N$ less about 1 volt plus the threshold voltage $V_T$. Prior to the conduction of transistor 17, the voltage $V_E$ of output rail 25 is limited to a value equal to the sum of the threshold voltages of transistors 17 and 22 above the negative rail voltage $V_N$.

When the biasing potential caused by the input pulse is removed from transistor 5, such transistor reverts to a non-conducting state whilst transistor 6 is switched to its conductive state by the potential on the plate 14 of capacitor 1. Thus, the potential $V_O$ of capacitor plate 2 falls as a result of the current flowing in transistor 6 and, as it does so, the potential $V_A$ of the other capacitor plate 14 also falls due to the capacitive coupling of the plates 2 and 14. The capacitor 1 does not lose any charge since transistor 17 is biased into a non-conducting state as soon as $V_A$ falls further in value. Therefore, transistor 6 is kept in its conductive state until potential $V_O$ substantially attains the negative rail voltage $V_N$, when potential $V_A$ has fallen by an amount equal to:

$$(\Delta V_O C_1)/(C_1 + C_2)$$

where $\Delta V_O$ is the fall in $V_O$,
$C_1$ is the capacitance of capacitor 1, and
$C_{15}$ is the capacitance of capacitor 15.
The final potential $V_A$ on capacitor plate 14 is thus:

$$V_N + V_T - (\Delta V_O C_1)/(C_1 + C_{15})$$

where $V_T$ is the threshold voltage of transistor 17 and is much less than $V_N$.

Capacitor 24 is charged by this potential via transistor 22 and, if pulses are repeatedly applied to transistor 5 in this fashion, the output voltage $V_E$ on output rail 25 attains the value of:

$$V_N + 2V_T - (\Delta V_O C_1)/(C_1 + C_{15})$$

where it has been assumed that the threshold voltage of transistor 22 is also $V_T$.

$C_1$ is very much greater than $C_{15}$, so that the quantity $C_1/(C_1 + C_{15})$ is almost equal to unity and, to an approximation,
$V_E$ may be written as:
$V_N + 2V_T - \Delta V_O$
which clearly can be considerably more negative than the value of $V_N$ itself.

I claim:
1. A voltage generator including:
a capacitor;
positive and negative power supply rails;
first and second normally non-conducting M.I.S. transistors each of which is connected between a respective plate of the capacitor and a respective power supply rail;
means to apply electrical pulses to a gate electrode of one of the first and second transistors to render the first and second transistors conducting for a limited period to charge the capacitor and then isolate the capacitor on the first and second switching devices reverting to their non-conducting state;
a normally non-conducting third M.I.S. transistor connected between one of the plates of the capacitor and the opposite power supply rail to that to which the one capacitor plate is connectable by the respective one of the first and second transistors; and,
output means connected to the other capacitor plate;
the third transistor having its gate electrode connected to the said other capacitor plate for biasing the third transistor to a conducting state in response to the said other capacitor plate attaining a predetermined voltage, whereby the third transistor is operative, on isolation of the capacitor subsequent to charging thereof, to connect the one capacitor plate to the said opposite power supply rail to produce an enhanced voltage on the said other capacitor plate.

2. A voltage generator according to claim 1, wherein the output means comprises a fourth M.I.S. transistor and a second capacitor, the fourth transistor having its gate electrode and one current carrying terminal connected to the said other capacitor plate, the second capacitor being connected between the other current carrying terminal of the fourth transistor and the power supply rail to which the said one capacitor plate is connected by the third transistor.

3. A voltage generator including:
a capacitor having first and second plates;
positive and negative power supply rails;
normally open first and second electrically controllable switching devices each of which is connected between a respective one of said first and second plates of the capacitor and a respective power supply rail;
means to trigger the first and second switching devices into the closed state thereof for a limited period to charge the capacitor and to then isolate the capacitor on the first and second switching devices reverting to their normally open state;
a normally open third electrically controllable switching device connected between one of the first and second plates of the capacitor and the power supply rail to opposite that which the said one capacitor plates is connectable by the respective one of the first and second switching devices; and,
output means connected to the other capacitor plate;
the third switching device being operatively connected to the said other capacitor plate for triggering to a closed state in response to the said other capacitor plate attaining a predetermined voltage, whereby the third switching device is operative, on isolation of the capacitor subsequent to charging thereof, to connect the said one of the first and second capacitor plates to the said opposite power supply rail to produce an enhanced voltage on the said other of the first and second capacitor plates.

4. A voltage generator according to claim 3, wherein the third switching device comprises an M.I.S. transistor having its gate electrode connected to the said other of the first and second capacitor plate.

5. A voltage generator according to claim 4, wherein the gate electrode of the third switching device is connected to one plate of a protective capacitor having its other plate connected to ground.

6. A voltage generator according to claim 3, wherein the means to trigger the first and second switching devices comprises means to apply electrical pulses to a control electrode of one of the first and second switching devices.

7. A voltage generator according to claim 3, wherein the output means comprises a fourth electrically controllable switching device connected to the said other capacitor plate, and a second capacitor, the fourth switching device being arranged to feed the enhanced voltage to the second capacitor across which a voltage output can be taken.

* * * * *